United States Patent [19]

Nagahori et al.

[11] Patent Number: 5,463,345
[45] Date of Patent: Oct. 31, 1995

[54] CIRCUIT FOR CONVERTING UNIPOLAR INPUT TO BIPOLAR OUTPUT

[75] Inventors: Takeshi Nagahori, Tokyo; Toshimasa Oami; Noriko Anzai, both of Kanagawa, all of Japan

[73] Assignee: NEC Corporation, Japan

[21] Appl. No.: 172,083

[22] Filed: Dec. 21, 1993

[30] Foreign Application Priority Data

Jan. 7, 1993 [JP] Japan .................................. 5-000908
Jun. 28, 1993 [JP] Japan .................................. 5-155956

[51] Int. Cl.$^6$ ................................................ H03K 17/04
[52] U.S. Cl. ........................ 327/374; 327/483; 327/491; 327/67
[58] Field of Search ................................. 327/101, 563, 327/575, 374, 375, 171, 67, 62, 483, 491

[56] References Cited

U.S. PATENT DOCUMENTS

| | | | |
|---|---|---|---|
| 3,491,307 | 1/1970 | Solomon et al. | 330/30 |
| 3,531,733 | 9/1970 | Haines, Jr. | 330/30 |
| 3,582,673 | 6/1971 | Clayson | 327/545 |
| 3,594,649 | 7/1971 | Rauch | 328/150 |
| 3,643,113 | 2/1972 | Brock et al. | 307/271 |
| 3,656,004 | 4/1972 | Kemerer et al. | 327/365 |
| 3,735,257 | 5/1973 | Roesner | 324/78 E |
| 3,748,494 | 7/1973 | Nine | 307/235 |
| 4,056,740 | 11/1977 | Schoeff | 327/65 |
| 4,479,094 | 10/1984 | Harris | 330/261 |
| 4,618,782 | 10/1986 | Lang et al. | 307/255 |
| 5,252,931 | 10/1993 | Nishiyama | 330/263 |

FOREIGN PATENT DOCUMENTS 0381371 8/1990 European Pat. Off. .
0430707 11/1990 European Pat. Off. .

OTHER PUBLICATIONS

"Bipolar High–Gain Limiting Amplifier IC for Optical–Fiber Receivers Operating up to 4 Gbts", Reinhard Reimann, et al. 8107 IEEE Journal of Solid–State Circuits, SC–22, Aug. 1987, No. 4, pp. 504–510.
"Bipolar High–Gain Limiting Amplifier IC for Optical–Fiber Receivers Operating up to 4 Gbts", Reinhard Reimann, et al. 8107 IEEE Journal of Solid–State Circuits, SC–22, Aug. 1987, No. 4, pp. 504–510.
DC–1Gb/s Burst–Mode Compatible Receiver For Optical Bus Applications, Journal Of Lightwave Technology, vol. 10, No. 2, Feb. 1992, New York, pp. 244–249.
Cascadable Low–Power Gain–Stabilished Limiting Amplifier Stage, Electronics Letters, vol. 22, No. 10, May 8, 1966, Herts, GB, pp. 520–521.

*Primary Examiner*—Timothy P. Callahan
*Assistant Examiner*—My-Trang Nu Ton
*Attorney, Agent, or Firm*—Laff, Whitesel, Conte & Saret, Ltd.

[57] ABSTRACT

The circuit for converting unipolar input to bipolar output includes a differential amplifier, first and second feedback resistors; and a peak detector. The negative output of the differential amplifier is fed back to the positive input of the differential amplifier through the first feedback resistor, and the positive output of the differential amplifier is fed back to the negative input of the differential amplifier through the peak detector and the second feedback resistor. A pole of lowest frequency among feedback amplifier circuits forming the circuit for converting unipolar input to bipolar output is to be determined with cut-off frequency of an amplification stage of the differential amplifier.

13 Claims, 10 Drawing Sheets

CIRCUIT FOR CONVERTING UNIPOLAR INPUT TO BIPOLAR OUTPUT

FIELD OF THE INVENTION

The invention relates to a circuit for converting unipolar input to bipolar output for use of automatic threshold control (hereinafter, it is referred to as "ATC") for a receiver used in burst mode digital signal transmission system such as passive double star optical subscriber transmission system, optical local area network (generally, referred to as "LAN") and optical interconnection system.

RELATED ART STATEMENT

U.S. Pat. No. 5,025,456 discloses one of circuit for converting unipolar input to bipolar output which use a differential input-output transimpedance amplifier by switching a gain among two gains, as ATC circuit used in a digital mode optical signal receiver for burst data, for carrying out automatic threshold control starting from a first bit in a burst.

Hereinbelow, the operation of a circuit for converting unipolar input to bipolar output is explained in brief with reference to FIG. 1.

FIG. 1 illustrates a relationship between wave shapes of input and output of a circuit for converting unipolar input to bipolar output. A circuit for converting unipolar input to bipolar output 50 includes a differential amplifier 1, a peak detector 2 and two feedback resistors 3 and 4. A negative output of the differential amplifier 1 is to be fed back to a positive input of the differential amplifier 1 through the feedback resistor 3, and a positive output of the differential amplifier 1 is to be fed back to a negative input of the differential amplifier 1 through the peak detector 2 and the feedback circuit 4. The differential amplifier 1 connects to a positive input terminal 131, a positive output terminal 132 and a negative output terminal 133.

As illustrated in FIG. 2, when the differential amplifier 1 receives current pulse having an amplitude $I_{in}$ only in the positive direction, namely having a unipolar code, the differential amplifier 1 produces a voltage pulse as a positive output having an amplitude $V_{out}^+$ in the positive direction and an amplitude $V_{out}^-$ in the negative direction. If the positive amplitude $V_{out}^+$ is equal to the negative amplitude $V_{out}^-$, the output voltage has a bipolar code.

The circuit for converting unipolar input to bipolar output 50 has two operation modes. When no signals or "L" level signals (signals having lowest input level among input digital signals) are in succession, namely the peak detector is in a reset condition, the circuit 50 enters a condition equivalent to a condition in which the peak detector 2 is short-circuited, at rise-up of a bit, on receiving "H" level signal (a signal having highest input level among input digital signals). If the feedback resistors 3 and 4 have a common value $R_F$, the differential transimpedance gain is almost equal to $R_F$. This mode is referred to as "Cold Mode" (See FIG. 1). After the bit falls down, the peak detector 2 retains the peak value of the bit. This condition is considered to be equivalent to a condition in which the negative input terminals of the differential amplifier 1 is connected to a constant voltage, so that the differential transimpedance gain is almost equal to $2R_F$. This mode is referred to as "Warm Mode" (See FIG. 1).

By switching these two modes, the circuit for converting unipolar input to bipolar output 50 has specific output voltage wave forms 52 when the input voltage has an amplitude $I_{in}$. Namely, the circuit 50 has wave forms swinging in the positive direction by $I_{in}R_F$ with respect to "H" level signals and wave forms swinging in the negative direction by $I_{in}R_F$ with respect to "L" level signals, each $I_{in}R_F$ being measured relative to output voltage generated when no signals are generated. Accordingly, by setting decision level "d" a little greater than level provided when no signals are generated, the circuit for converting unipolar input to bipolar output 50 may have output voltage pulses which never cross the decision level "d" at the approximate center of pulse amplitudes and hence is able to work as an automatic threshold control (ATC) circuit.

FIG. 3 shows an example of conventional circuit for converting unipolar input to bipolar output.

Since the circuit illustrated in FIG. 3 is used for a DC-coupled amplifier dealing with very small input signals, it is important to reduce offset of the bias voltage of the circuit. It is an already known technique to equalize DC (direct current) characteristics of an differential amplifier with that of a peak detector in order to minimize output offset voltage equivalent to a difference voltage between positive and negative outputs. The aforementioned U.S. Pat. No. 5,025,456 explains this technique in detail.

In addition, in order to maintain DC characteristics of an differential amplifier equal to that of a peak detector regardless of variation of ambient temperatures and supply voltage, a specific circuit had been suggested in the 6th Optical Transmission System Symposium held on December, 1992 in Japan. As illustrated in FIG. 3, this circuit includes a differential amplifier 1 and a peak detector 2. The differential amplifier 1 comprises an emitter-coupled amplification circuit 110 and two emitter follower output stages 130, 140 each stage including a pair of transistors 115, 116 and 117, 118. The transistors 115, 117 are darlington-connected to the transistors 116, 118. The peak detector 2 comprises an emitter-coupled amplification circuit 120 having the same operation point with respect to dc as the emitter-coupled amplification circuit 110, a current blocking transistor 125 a base of which is connected to positive output of the emitter-coupled amplification circuit 120 and an emitter of which is connected to a hold capacitor 129 for retaining peak values, and a buffer transistor 126 a base of which is connected to an emitter of the current blocking transistor 125 and an emitter of which is connected to negative input of the emitter-coupled amplification circuit 120.

In brief, the differential amplifier 1 had the same amplification stages as those of the peak detector 2 thereby to equalize DC characteristic of the differential amplifier 1 to that of the peak detector 2.

When this circuit is to be used for ATC for receivers in TDMA (Time Division Multiple Access) system, it is necessary to discharge just enough the hold capacitor provided in the peak detector within guard time between bursts. As stated in "Journal of Lightwave Technology" Vol. 10, No. 2, page 244, in order to reduce discharging time thereby to reduce requisite guard time, a constant current source 150 had been conventionally disposed in parallel with the hold capacitor 129 thereby to enhance discharging speed.

However, the above mentioned conventional circuit for converting unipolar input to bipolar output had problems to be solved as follows.

As aforementioned, the differential amplifier 1 has the output stage comprising two pairs of transistors each pair comprising first stage transistors 115, 117 and second stage transistors 116, 118 having darlington connections with the first stage transistors 115, 117 in order to equalize DC characteristics of the differential amplifier to that of the peak detector regardless of variation of ambient temperature and supply voltage. In this circuit, there is a problem that the differential amplifier may work in an identical way with the peak detector due to parasitic capacitance of the ground and the emitters of the transistors 115, 117 forming the first stage of the output stage, thereby to reduce the operation speed of the circuit for converting unipolar input to bipolar output.

With reference to FIGS. 3 and 5, discussed in detail hereinbelow are problems which arise when the aforementioned conventional circuit is used for ATC for receivers in TDMA system. FIG. 5 illustrates various wave shapes of input and output of a circuit for converting unipolar input to bipolar output, and peak values. FIG. 5-A illustrates input current and FIG. 5-B illustrates output voltages of a peak detector and positive output voltages of ATC circuit. Among FIG. 5-B, compulsory resets, namely so-Galled active resets, are not carried out and the leak speed of the peak detector is low in FIG. 5-B-a, while compulsory resets are not carried out and the leak speed of the peak detector is high in FIG. 5-B-b. In FIG. 5-B, the wave shapes of positive output of ATC circuit are represented with solid lines, the wave shapes of output of the peak detector are represented with broken lines, and decision levels are represented with chain lines.

As illustrated in FIG. 5-A, when the circuit for converting unipolar input to bipolar output is used as ATC circuit for receivers in TDMA system, the circuit for converting unipolar input to bipolar output often receives a burst 2 of small input power level just after receiving a burst 1 of big input power level. In this case, as illustrated in FIG. 5-B-a, if the peak detector retains peak value corresponding to the burst 1 during receiving the burst 2, pulses corresponding to "H" level of the burst 2 do not reach the decision level. Accordingly, in order to reduce the requisite guard time between bursts, it is necessary to reset the peak detector as early as the burst has ended and hence return the circuit to the cold mode. As illustrated in FIG. 3, a conventional circuit for converting unipolar input to bipolar output is provided with the constant current source 150 for supplying constant current with the circuit thereby to increase the leak speed of the peak detector 2 and hence reduce reset time. However, as illustrated in FIG. 5-B-b, the use of the constant current source for reducing time to return to the cold mode also makes it easy for the circuit, during "L" level signals are in succession in the burst, to return to the cold mode of the circuit for converting unipolar input to bipolar output when the discharge thereof is completed. The return to the cold mode in the burst causes the decision phase of the cold mode, in which the "H" level input signal intersects the decision level when the "H" level signal rises up, to advance more than the decision phase of the warm mode, so that clock phase margin of the output of the circuit for converting unipolar input to bipolar output is decreased. In addition, if light is used as input signals, incorrect extinction ratio of the input signals increases cases of confusing "L" level with "H" level. Thus, there arises a problem that an optical transmitter to be used has only restricted area of extinction ratio.

A conventional circuit for converting unipolar input to bipolar output has different problems from the above mentioned ones.

In wave shapes of the circuit for converting unipolar input to bipolar output as illustrated in FIG. 2, the amplitude $V_{out}^-$ in the negative direction is usually smaller than the amplitude $V_{out}^+$ in the positive direction. In order to nearly equalize the amplitude $V_{out}^-$ with the amplitude $V_{out}^+$, it is necessary to make input resistance of the differential amplifier 1 greater enough than the feedback resistors 3, 4. In a conventional way, since the circuit illustrated in FIG. 3 is used as a preamplifier of an optical receiver, feedback resistors are arranged as high as possible in order to reduce thermal noises due to the feedback resistors.

In order to increase input resistance of the differential amplifier 1 and reduce noises due to base current in transistors 101, 102, collector resistances 103, 104 need to be arranged to be high. However, if the collector resistances 103, 104 are arranged high, a pole of second lowest frequency approaches a pole of lowest frequency of feedback amplifier circuits, so that the phase margin decreases. Accordingly, a ratio between the input resistance of the differential amplifier 1 and the feedback resistors 3, 4 is in trade off relationship with the phase margin of the feedback amplifier circuits, and therefore cannot be made greater. Due to that the ratio cannot be greater, there arise a problem that unipolar and bipolar codes can be converted with less accuracy, namely the amplitude $V_{out}^-$ in the negative direction is smaller than the amplitude $V_{out}^+$ in the positive direction. In addition, the accuracy of conversion was much dependent on current gain of the transistors 101, 102.

SUMMARY OF THE INVENTION

It is an object of the present invention to provide a circuit for converting unipolar input to bipolar output for ATC in order to construct a digital receiver receiving sensitivity of which has little dependency on supply voltage and ambient temperature due to variation of output offset, and which has wide bandwidth.

It is another object of the present invention to provide a circuit for converting unipolar input to bipolar output capable of carrying out high speed and stable resets without giving any restriction to successive "L" level signals within a common burst in transmissive signals of TDMA system.

It is still another object of the present invention to provide a circuit for converting unipolar input to bipolar output for ATC of digital receivers, having high accuracy and low output offset.

In one aspect, the invention provides a circuit for converting unipolar input to bipolar output including a differential amplifier, a peak detector, first and second feedback resistors, and a capacitor.

The differential amplifier includes a first emitter-coupled amplifying circuit and an emitter follower output stage. The emitter follower output stage includes two pairs of transistors each pair including a first stage transistor and a second stage transistor having a darlington connection with the first stage transistor.

The peak detector includes a second emitter-coupled amplifying circuit having an identical dc operation point with the first emitter-coupled amplifying circuit, a current blocking transistor a base of which is connected to positive output of the second emitter-coupled amplifying circuit and an emitter of which is connected to a hold capacitor for maintaining peak values, and a buffer transistor a base of which is connected to an emitter of the current blocking transistor and an emitter of which is connected to the negative input of the second emitter-coupled amplifying circuit.

The negative output of the differential amplifier is fed back to the positive input of the differential amplifier through the feedback resistor, and the positive output of the differential amplifier is fed back to the negative input of the differential amplifier through the peak detector and the second feedback resistor.

The capacitor is disposed in parallel between the base and emitter of at least the first stage transistor connected to the first emitter-coupled amplifying circuit among the pair of transistors.

In a preferred embodiment, the circuit for converting unipolar input to bipolar output further includes a reference voltage producing circuit for producing a reference voltage equivalent to an average of positive output and negative output of the emitter output stage of the first stage transistor, and a switching circuit capable of being externally turned on or off, disposed between an emitter of the current blocking transistor and the reference voltage producing circuit.

In another aspect, the invention provides a circuit for converting unipolar input to bipolar output including the differential amplifier, the peak detector, the first and second feedback resistors, the reference voltage producing circuit, and the switching circuit, all of these elements are identical with those set forth in the previous aspect.

In a preferred embodiment, the reference voltage producing circuit includes a voltage divider for obtaining an average of the positive output and negative output of the first emitter-coupled amplifying circuit by means of voltage division, a darlington pair including two stages of transistor, a base of a first stage transistor being connected to the voltage divider, and an impedance convertor connected to an emitter output of the first stage transistor of the darlington pair.

In still another aspect, the invention provides a circuit for converting unipolar input to bipolar output including a first differential amplifier, first and second feedback resistors, a peak detector including a second differential amplifier, first and second dummy differential amplifier circuits, and a third differential amplifier.

The negative output of the first differential amplifier is fed back to the positive input of the first differential amplifier through the first feedback resistor, and the positive output of the first differential amplifier is fed back to the negative input of the first differential amplifier through the peak detector and the second feedback resistor.

The peak detector comprises a voltage follower circuit in which the positive output of the second differential amplifier is fed back to the negative input of the second differential amplifier.

The first dummy differential amplifier circuit produces a voltage equal to an output bias level of the first differential amplifier.

The second dummy differential amplifier circuit produces a voltage equal to an output bias level of the second differential amplifier being in the condition that the positive output thereof is not fed back to the negative input thereof.

The third differential amplifier amplifies a difference voltage between the first and second dummy differential amplifier circuits and feeds the amplified difference voltage back to an input of DC operation point adjustment of one of the first differential amplifier and the first dummy differential amplifier circuit, and the second differential amplifier and the second dummy differential amplifier circuit.

In a preferred embodiment, the first and second dummy differential amplifier circuits and a plurality of the circuit for converting unipolar input to bipolar output are integrated into one integrated circuit chip.

In yet another aspect, the present invention provides a circuit for converting unipolar input to bipolar output including a first differential amplifier, first and second feedback resistors, a peak detector, a dummy differential amplifier circuit, a dummy peat detecting circuit, and a second differential amplifier.

The negative output of the first differential amplifier is fed back to the positive input of the first differential amplifier through the first feedback resistor, and the positive output of the first differential amplifier is fed back to the negative input of the first differential amplifier through the peak detector and the second feedback resistor.

The dummy differential amplifier circuit produces a voltage equal to an output bias level of the first differential amplifier.

The dummy peak detector produces a voltage equal to an output bias level of the first differential amplifier.

The second differential amplifier is included in the peak detector and amplifies a difference voltage between the dummy differential amplifier circuit and the dummy peak detector, and feeds the amplified difference voltage back to an input of DC operation point adjustment of one of the first differential amplifier and the dummy differential amplifier circuit, and the peak detector and the dummy peak detector.

In a preferred embodiment, the dummy differential amplifier circuit, the dummy peak detector and a plurality of the circuit for converting unipolar input to bipolar output are integrated into one integrated circuit chip.

In still yet another aspect, the present invention provides a circuit for converting unipolar input to bipolar output including a first differential amplifier, first and second feedback resistors, a peak detector, a dummy circuit for converting unipolar input to bipolar output, and a second differential amplifier.

The negative output of the first differential amplifier is fed back to the positive input of the first differential amplifier through the first feedback resistor, and the positive output of the first differential amplifier is fed back to the negative input of the first differential amplifier through the peak detector and the second feedback resistor.

The dummy circuit for converting unipolar input to bipolar output has the same direct-current characteristics as the circuit for converting unipolar input to bipolar output.

The second differential amplifier is included in the peak detector and amplifies a difference voltage between positive and negative outputs of the dummy circuit for converting unipolar input to bipolar output, and feeds the amplified difference voltage back to an input of offset adjustment of the circuit for converting unipolar input to bipolar output and the dummy circuit for converting unipolar input to bipolar output.

In a preferred embodiment, the dummy circuit for converting unipolar input to bipolar output and a plurality of the circuit for converting unipolar input to bipolar output are integrated into one integrated circuit chip.

In further another aspect, the present invention provides a circuit for converting unipolar input to bipolar output including a differential amplifier, first and second feedback resistors, and a peak detector.

The negative output of the differential amplifier is fed back to the positive input of the differential amplifier through the first feedback resistor, and the positive output of the differential amplifier is fed back to the negative input of the differential amplifier through the peak detector and the second feedback resistor.

The differential amplifier has two or more stages including at least an input buffer stage and an amplification stage.

In still further another aspect, the present invention provides a circuit for converting unipolar input to bipolar output including a differential amplifier, first and second feedback resistors, and a peak detector.

The negative output of the differential amplifier is fed back to the positive input of the differential amplifier through the first feedback resistor, and the positive output of the differential amplifier is fed back to the negative input of the differential amplifier through the peak detector and the second feedback resistor.

A pole of lowest frequency among feedback and amplifier circuits forming the circuit for converting unipolar input to bipolar output is to be determined with cut-off frequency of an amplification stage of the differential amplifier.

The advantages obtained by the aforementioned present invention will be described hereinbelow.

In the present invention, the capacitor is disposed in parallel between the base and emitter of at least the first stage transistor directly coupled to the emitter-coupled amplification circuit. This arrangement causes high frequency current for charging and discharging the parasitic capacitance between the emitter of the transistor and the ground, to flow into the capacitor disposed in parallel with the transistor, so that it can be avoided to cause the reduction of operation speed of the circuit for converting unipolar input to bipolar output due to the reduction of operation speed of the emitter follower output stage.

In addition, with respect to resets of the circuit for converting unipolar input to bipolar output, since the invention can switch the leak speed of the peak detector by externally turning on or off the switching circuit, it is possible to arrange the leak speed to be low in a common burst and to be high between bursts. Furthermore, regardless of ambient temperature and supply voltage, the voltage to which the hold capacitor leaks is coincident with the target voltage generated when the leak has finished, so that stable resets can be performed with a time constant which is a product of a resistance generated when the switch circuit output stage is turned to be on, and a capacity of the hold capacitor.

In the circuit for converting unipolar input to bipolar output in accordance with the invention, the output bias level is almost coincident with that of the peak detector, and therefore the output offset can be prevented regardless of ambient temperature and supply voltage.

In the circuit for converting unipolar input to bipolar output in accordance with the invention, a pole of the lowest frequency of feedback amplifier circuits is not dependent on the feedback resistor. Thus, since a ratio of input resistance to feedback resistor of the differential amplifier circuit can be made high with a sufficient phase margin acquired, the accuracy in converting the unipolar and bipolar codes can be enormously enhanced.

The above and other objects and advantageous features of the present invention will be made apparent from the following description made with reference to the accompanying drawings,

DESCRIPTION OF THE PREFERRED EMBODIMENTS

A preferred embodiment in accordance with the invention will be explained hereinbelow with reference to drawings.

Figure 4:
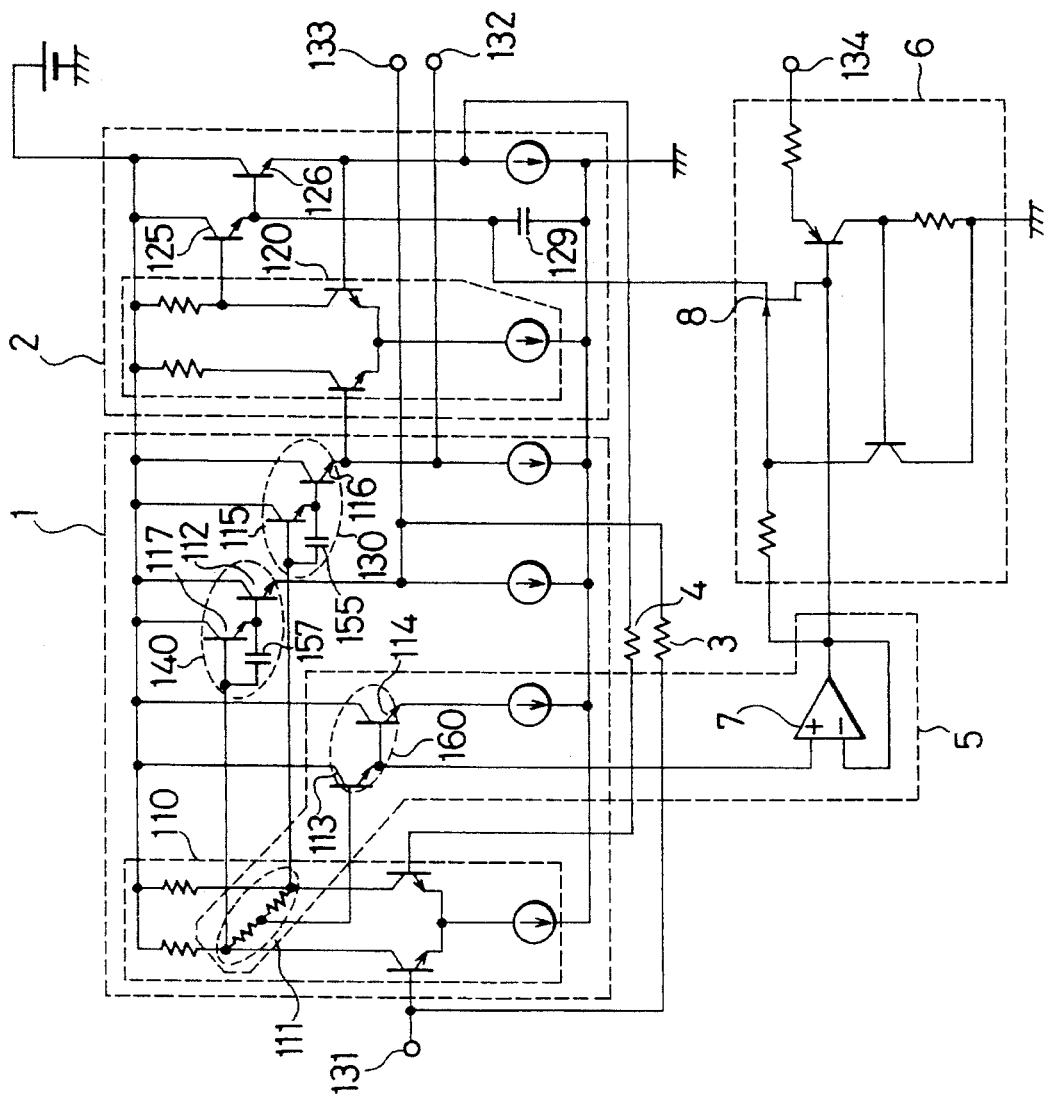
FIG. 4 is a circuit diagram of a first embodiment in accordance with the invention.

FIG. 4 is a circuit diagram illustrating a first embodiment in accordance with the invention. As illustrated in FIG. 4, this circuit includes a differential amplifier 1 and a peak detector or a peak detecting circuit 2. The differential amplifier 1 comprises an emitter-coupled amplification circuit 110 and two emitter follower output stages 130, 140 each stage including a pair of transistors 115, 116 and 117, 118. The transistors 115, 117 are darlington-connected to the transistors 116, 118. The peak detector or the peak detecting circuit 2 comprises an emitter-coupled amplification circuit 120 having the same operation point with respect to direct current as the emitter-coupled amplification circuit 110, a current blocking transistor 125 a base of which is connected to positive output of the emitter-coupled amplification circuit 120 and an emitter of which is connected to a hold capacitor 129 for retaining peak values, and a buffer transistor 126 a base of which is connected to an emitter of the current blocking transistor 125 and an emitter of which is connected to negative input of the emitter-coupled amplification circuit 120. Capacitors 155, 157 are disposed in parallel between a base and an emitter of the first stage transistors 115, 117 each directly connected to the emitter-coupled amplification circuit 110.

High frequency current for charging and discharging a parasitic capacitance between an emitter of the transistors 115, 117 and the ground flow into the capacitors 155, 157, resulting in that the reduction of operation speed of the circuit for converting unipolar input to bipolar output due to the reduction of operation speed of the emitter follower output stage can be prevented. In addition, since the peak detector or the peak detecting circuit 2 maintains its DC characteristics unchanged even if the capacitors 155, 157 are added, the DC characteristics of the differential amplifier is kept to be identical with that of the peak detector regardless of the variation of ambient temperature and supply voltage. Accordingly, it is possible to obtain a circuit for converting unipolar input to bipolar output for ATC having small dependency of receiving sensitivity on supply voltage and ambient temperature, and making it possible to form a digital receiver having wide bandwidth.

Figure 1:
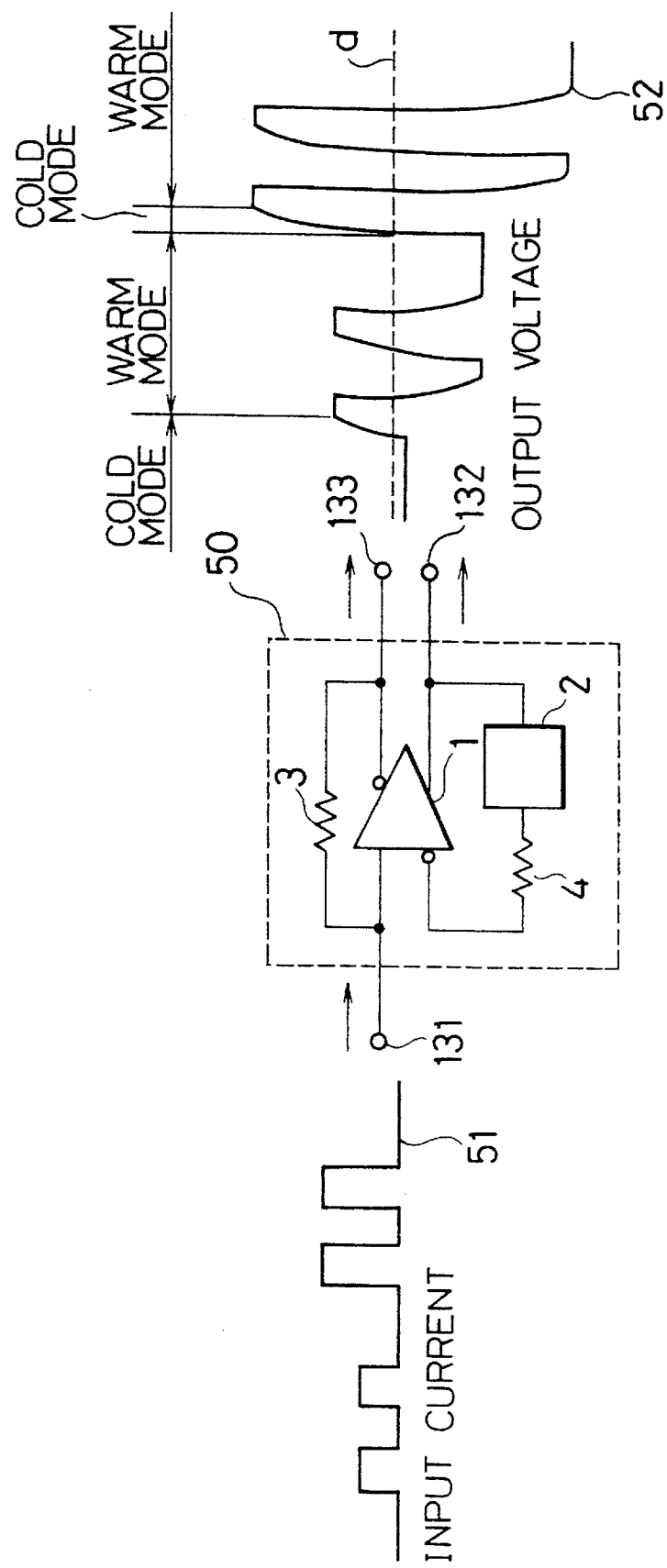
FIG. 1 illustrates wave shapes showing a principle of a circuit for converting unipolar input to bipolar output.
Figure 2:
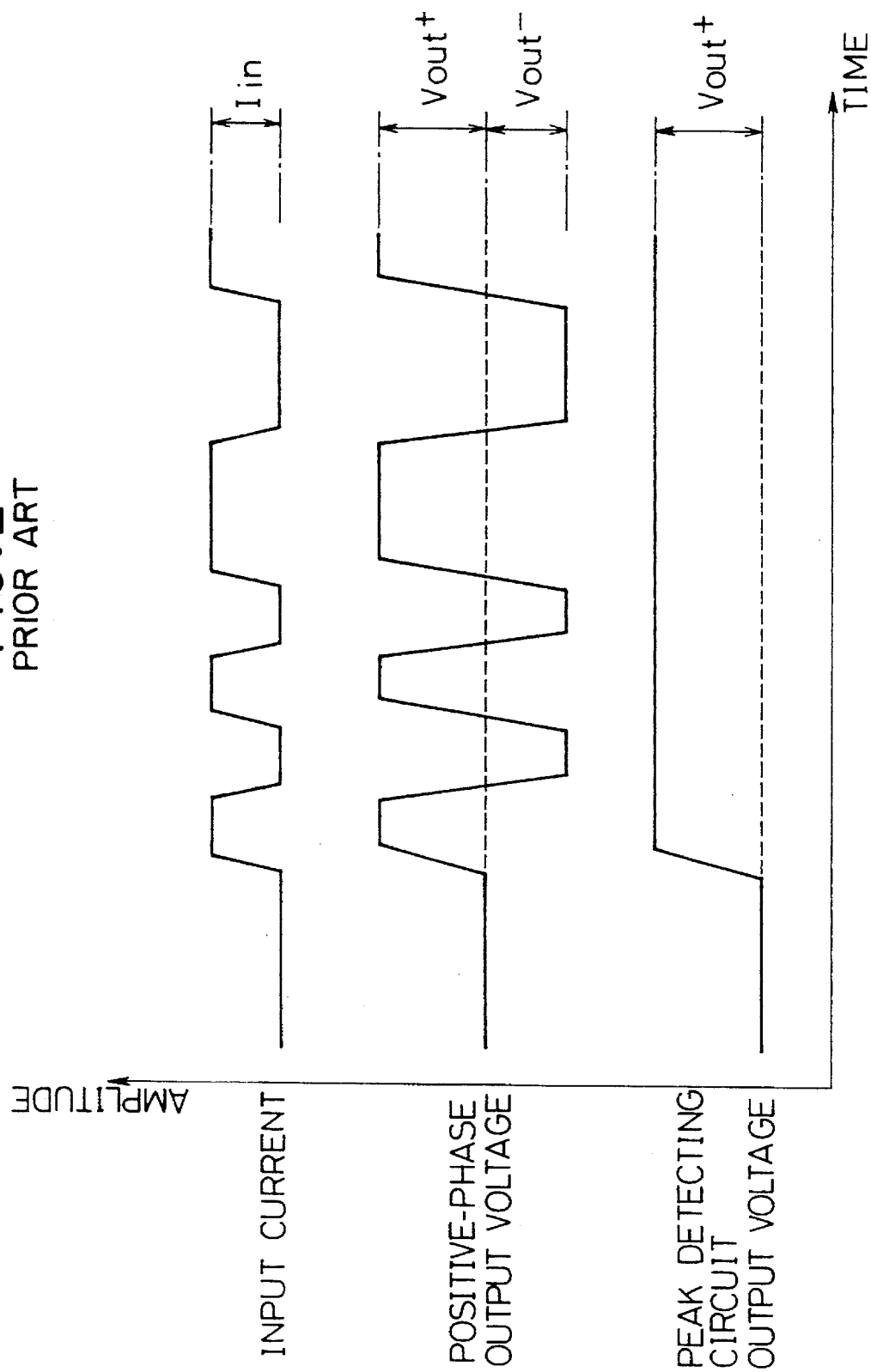
FIG. 2 illustrates wave shapes of input and output of a circuit for converting unipolar input to bipolar output.
Figure 3:
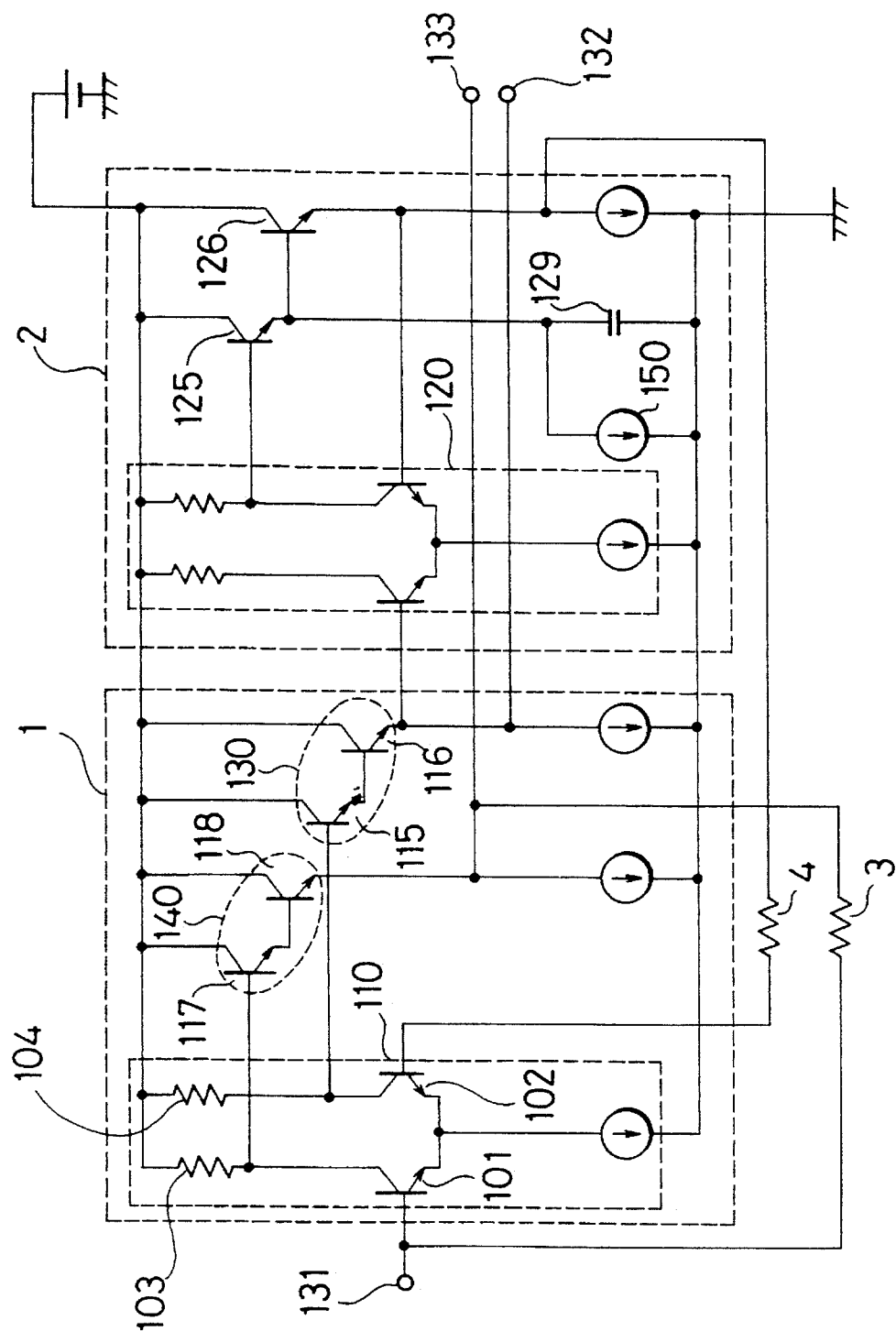
FIG. 3 is a circuit diagram of a conventional circuit for converting unipolar input to bipolar output.
Figure 5:
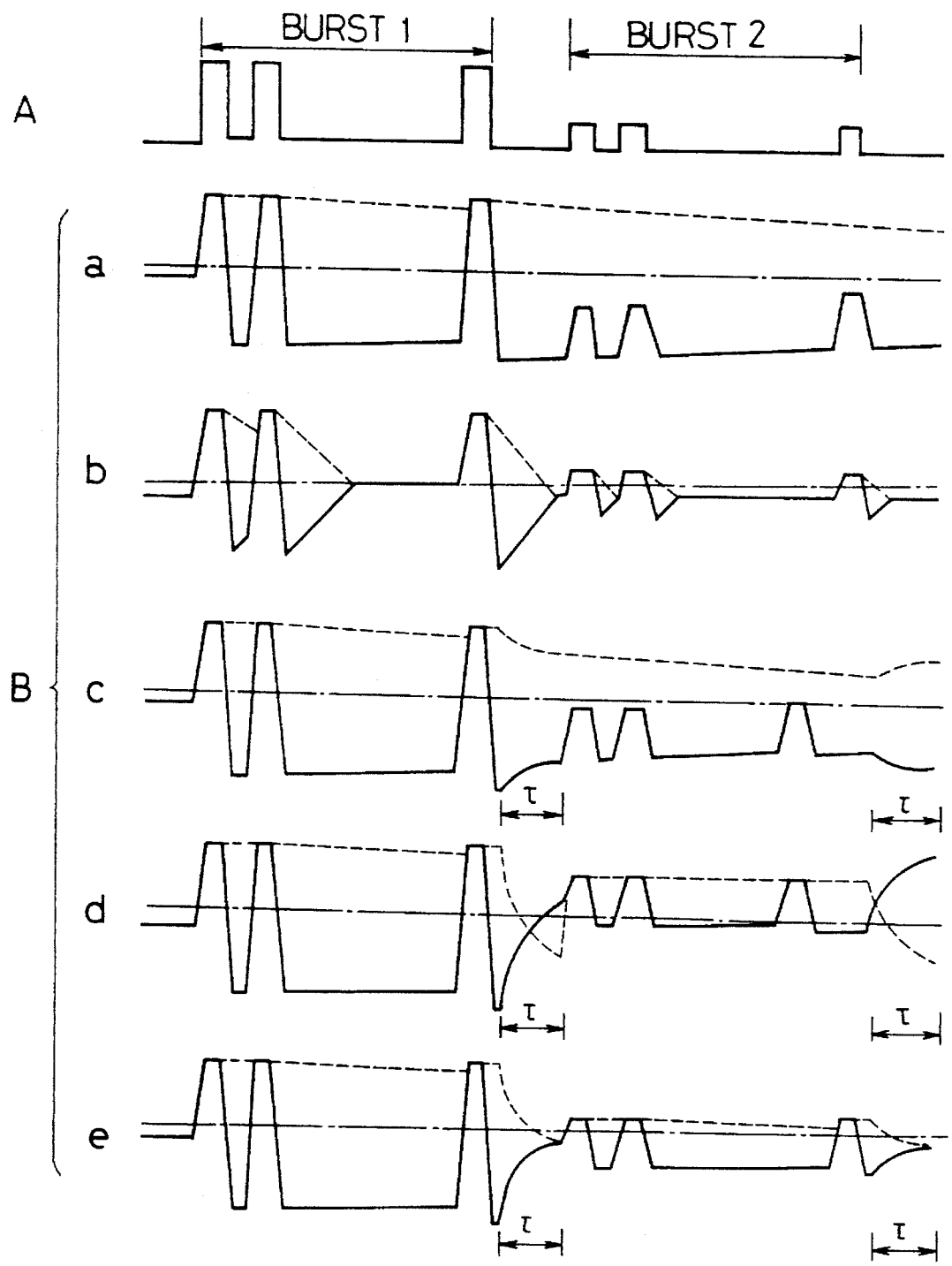
FIG. 5 illustrates various wave shapes in A and B for explaining the operation of the circuit in accordance with the invention.

Hereinbelow, with reference to FIGS. 1 and 2, the operation of the reference voltage producing circuit 5 and the switching circuit 6. Among FIG. 5-B, compulsory resets are carried out and the reference voltage is greater than the target voltage in FIG. 5-B-c, while compulsory resets are carried out and the reference voltage is smaller than the target voltage in FIG. 5-B-d, and compulsory resets are carried out and the reference voltage is equal to the target voltage in FIG. 5-B-e. In FIG. 5-B, the wave shapes of positive output of the circuit for converting unipolar input to bipolar output are represented with solid lines, the wave shapes of output of the peak detector are represented with broken lines, and decision levels are represented with chain lines.

In the reference voltage producing circuit 5, an average of the positive output and the negative output of the emitter-coupled amplification circuit 110 is detected by a voltage division circuit 111. The level of this average is shifted by the transistors 113, 114 and then the average is introduced to an impedance convertor or an impedance converting circuit 7 from the emitter of the transistor 113. The output stage of the switching circuit 6 comprises JFET 8, which is turned on or conductive when voltage applied to an input terminal 134 is "L", while turned off or nonconductive when voltage applied to the input terminal 134 is "H".

Since the time when a burst ends can be known in TDMA transmission system, reset signal pulses with duration of $\tau$ can be obtained externally of the circuit for converting unipolar input to bipolar output within a guard time, and be applied to the terminal 134 to which the reset signals are to be input. It should be noted that pulse durations $\tau$ of the reset signals should be greater than a time constant which is equivalent to a product of the resistance generated when JFET 8 is turned on and the capacity of the capacitor 129. In this embodiment, JFET 8 is turned on or conductive only within a time interval $\tau$ in which voltage applied to the input terminal 134 is "L", while JFET 8 is turned off or nonconductive within time other than the time intervals $\tau$. In the time other than the time intervals $\tau$, voltage applied to the input terminal 134 is "H".

As illustrated in FIG. 5-B-e, since the leak speed of the peak detector is arranged to be slow enough, the peak detector 2 maintains a peak value of pulses forming the burst 1 even if "L" level signals are in succession within a series of pulses in the burst 1. Thus, the possibility is low at which the circuit for converting unipolar input to bipolar output returns to the cold mode in the burst 1. Accordingly, the problems that the clock phase margin of the output of the identification circuit is reduced and that the extinction ratio of optical transmitters is restricted can be solved out.

By applying reset signals having time intervals $\tau$ to the input terminal 134 as soon as the burst 1 ends, JFET 8 is turned to be conductive only within a period $\tau$ and the capacitor 129 retaining electric charges corresponding to a peak value in the peak detector 2 is discharged to the reference voltage producing circuit 5. Since the pulse duration $\tau$ of the reset signals is greater than the time constant defined with a product of the resistance generated JFET 8 is turned to be on and the capacity of the capacitor 129, the discharge ends within the time interval $\tau$ and the peak detector 2 is reset thereby to cause the circuit for converting unipolar input to bipolar output to return to the cold mode.

Though the output voltage of the peak detector 2 when the discharge has ended is equal to the output voltage of the reference voltage producing circuit, the latter output voltage has to be equal to a voltage (discharge target voltage) when the discharge ends by natural discharge due to continuous input of no signals. When the output voltage of the reference voltage producing circuit 5 is higher than the target voltage, as illustrated in FIG. 5-B-c, sufficient reset is not carried out. Accordingly, pulses corresponding to "H" level of the burst 2 do not reach the decision level. On the other hand, when the output voltage of the reference voltage producing circuit 5 is higher than the target voltage, as illustrated in FIG. 5-B-d, excessive discharge occurs and hence pulses corresponding to "L" level of the burst 2 may exceed the decision level.

However, in this circuit in accordance with the embodiment, since the differential amplifier 1 has the same DC characteristics as the peak detector 2, the output voltage of the voltage division circuit 111 is equal, regardless of presence or absence of input signals, to the output voltage of the emitter-coupled amplification circuit 120 generated when no signals are input. In addition, since the transistors 113, 114 has the same DC characteristics as that of the transistors 125, 126 respectively and the transistor 114 has the same drive current as the transistor 126, the voltage between a base and an emitter of the transistor 113 is equal to the voltage between a base and an emitter of the transistor 125. Accordingly, the output voltage of the emitter of the transistor 113 can be considered to be equal to the output voltage of the emitter of the transistor 125 generated when no signals is input, namely the discharge target voltage. By operating the impedance convertor 7 using the output voltage of the emitter of the transistor 113 as input signals, the output voltage of the reference voltage producing circuit 5 can be maintained to be equal to the target voltage regardless of the presence or absence of the input signals and the variation of ambient temperature and supply voltage.

Thus, stable resets are carried out at high speed without problems occurring when the circuit for converting unipolar input to bipolar output returns to the cold mode while "L" level are in succession in a common burst in transmission signals of TDMA system, and also without dependency on the variation of ambient temperature and supply voltage.

In this embodiment, JFET is used in the output stage of the switching circuit, however, other elements may be used instead such as a switching element including a bipolar transistor and MOSFET or a combination thereof.

Figure 6:
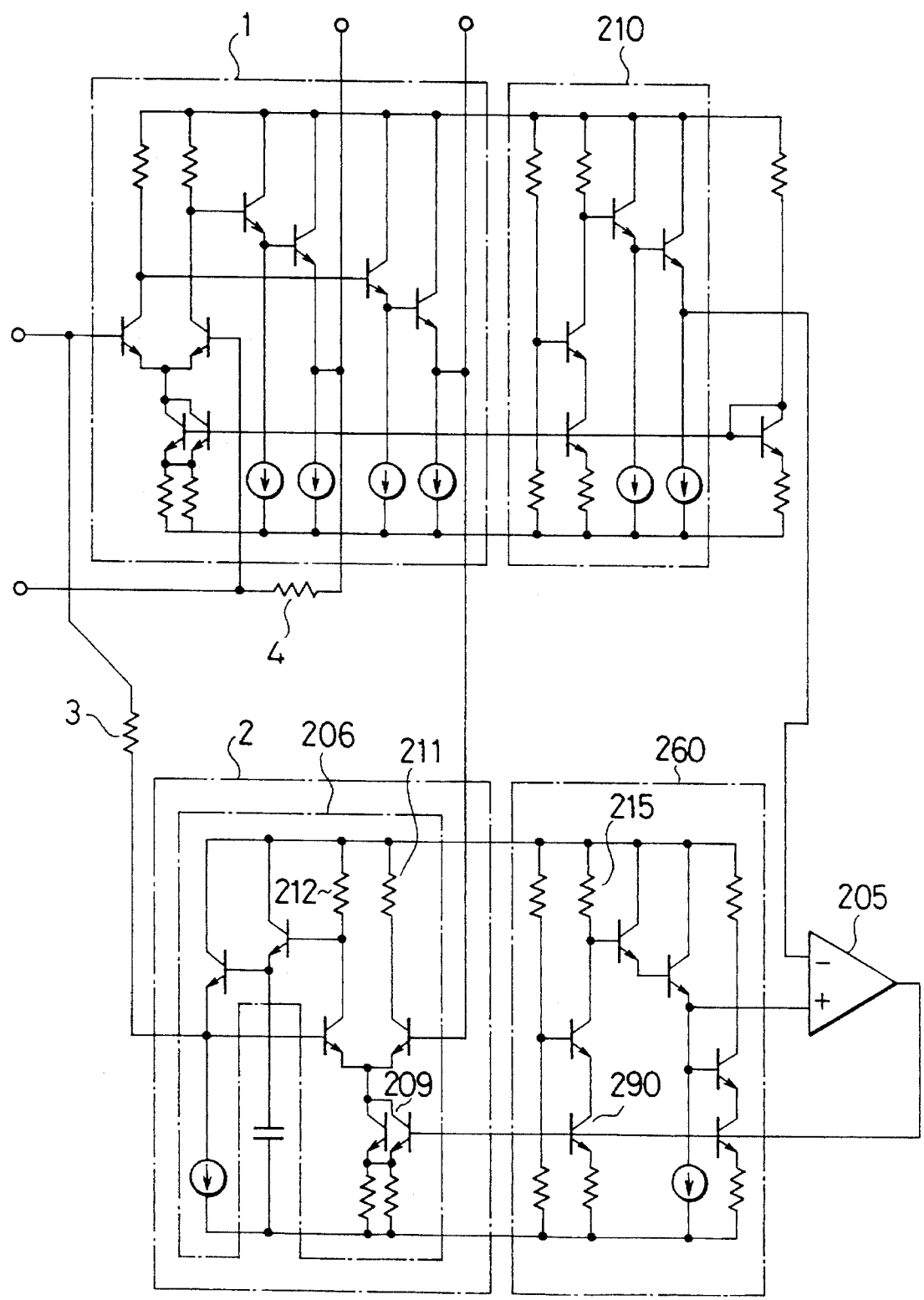
FIG. 6 is a circuit diagram of a second embodiment in accordance with the invention.

FIG. 6 is a circuit diagram of the second embodiment in accordance with the invention. A circuit for converting unipolar input to bipolar output illustrated in FIG. 6 has a first differential amplifier 1. The negative output of the differential amplifier 1 is fed back to the positive input thereof through the feedback resistor 4, and the positive output of the differential amplifier 1 is fed back to the negative input thereof through the peak detector 2 and the feedback resistor 3. The peak detector 2 includes a second differential amplifier 206 and comprises a voltage follower circuit in which the positive output of the second differential amplifier 206 is fed back to the negative input thereof. First and second dummy differential amplifier circuits 210 and 260 are connected to the first and second differential amplifier 1 and 206 respectively, and generate voltage equal to the output bias voltage of the first and second differential amplifier 1 and 206. A third differential amplifier 205 amplifies a difference voltage between the outputs of the first and second dummy differential amplifiers 210 and 260, and feeds thus amplified difference voltage back to bases of transistors 209 and 290. The transistor 209 comprise current source for driving an amplification stage of the second differential amplifier 206, and the transistor 290 comprise current source for driving an amplification stage of the second dummy differential amplifier 260.

When the output bias voltage of the second differential amplifier 206 is greater than the output bias voltage of the first differential amplifier 1 by a voltage ΔV due to variation of temperature and supply voltage, the output bias voltage of the second dummy differential amplifier 260 is greater than the output bias voltage of the first dummy differential amplifier 210 by the voltage ΔV. This causes the third differential amplifier 205 to produce greater output voltage, and accordingly the base voltages of the transistors 209, 290 go up thereby to increase current flowing in the amplification stages of the second differential amplifier 206 and the second dummy differential amplifier 260. Thus, the voltages across the load resistors in the amplification stage increase and accordingly the output bias voltages of the second differential amplifier 206 and the second dummy differential amplifier 260 decrease. That is, suppose that a loop gain of a feedback loop obtained by the third differential amplifier 205 is $A_5$, the difference voltage ΔV between the first and second dummy differential amplifiers 210 and 260 is reduced to $ΔV/A_5$.

Since the output bias voltage of the first differential amplifier 1 is equal to the output bias voltage of the first dummy differential amplifier 210, and the output bias voltage of the second differential amplifier 206 is equal to the output bias voltage of the second dummy differential amplifier 260, the difference voltage between the output bias voltages of the second differential amplifier 206 and the first differential amplifier 1 is also reduced to $ΔV/A_5$. Since the peak detector 2 comprises a voltage follower circuit in which the positive output of the second differential amplifier 206 is fed back to the negative input of the amplifier 206, the difference voltage between the output bias voltages of the first differential amplifier 1 and the peak detector 2 is further reduced by a loop gain of the peak detector 2 thereby to become almost zero (0). Thus, the output bias level of the differential amplifier 1 is coincident with that of the peak detector 2 with high accuracy regardless of ambient temperature and supply voltage, and accordingly the output offset of the circuit for converting unipolar input to bipolar output generated due to ambient temperature and supply voltage does scarcely occur.

Figure 7:
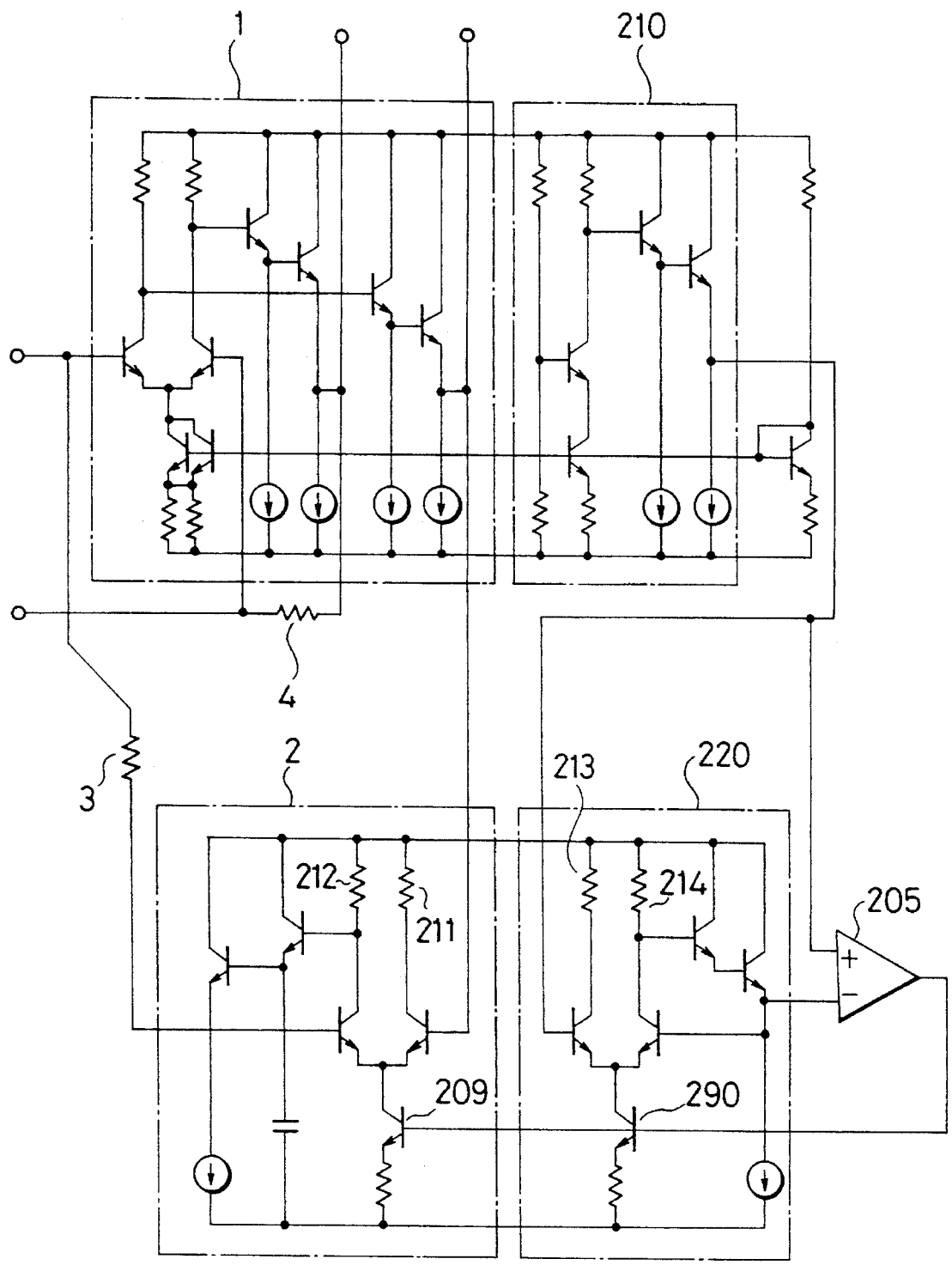
FIG. 7 is a circuit diagram of a third embodiment in accordance with the invention.

FIG. 7 is a circuit diagram of a third embodiment in accordance with the invention. Similarly to the aforementioned second embodiment, a circuit for converting unipolar input to bipolar output illustrated in FIG. 7 has a first differential amplifier 1. The negative output of the differential amplifier 1 is fed back to the positive input thereof through the feedback resistor 4, and the positive output of the differential amplifier 1 is fed back to the negative input thereof through the peak detector 2 and the feedback resistor 3. A first dummy differential amplifier circuits 210 is connected to the first differential amplifier 1, and generates voltage equal to the output bias voltage of the first differential amplifier 1. A dummy peak detector 220 is the same circuit as the peak detector 2 and receives the output of the dummy differential amplifier 210. A differential amplifier 205 amplifies a difference voltage between the outputs of the dummy peak detector 220 and the dummy differential amplifier 210, and feeds thus amplified difference voltage back to bases of transistors 209 and 290. The transistor 209 comprise current source for driving an amplification stage of the peak detector 2, and the transistor 290 comprise current source for driving an amplification stage of the dummy peak detector 220.

When the output bias voltage of the peak detector 2 is greater than the output bias voltage of the differential amplifier 1 by a voltage ΔV due to variation of temperature and supply voltage, the output bias voltage of the dummy peak detector 220 is greater than the output bias voltage of the dummy differential amplifier 210 by the common voltage ΔV. This causes the differential amplifier 205 to produce greater output voltage, and accordingly the base voltages of the transistors 209, 290 go up thereby to increase current flowing in the amplification stages of the peak detector 2 and the dummy peak detector 220. Thus, the voltage drop increases in the collector resistances 211, 212, 214 of the amplification stage and accordingly the output bias voltages of the peak detector 2 and the dummy peak detector 220 decrease. That is, suppose that a loop gain of a feedback loop obtained by the differential amplifier 205 is $A_5$, the difference voltage ΔV between the dummy peak detector 220 and the dummy differential amplifier 210 is reduced to $ΔV/A_5$.

Since the output bias voltage of the differential amplifier 1 is equal to the output bias voltage of the dummy differential amplifier 210, and the output bias voltage of the peak detector 2 is equal to the output bias voltage of the dummy peak detector 220, the difference voltage between the output bias voltages of the peak detector 2 and the differential amplifier 1 is also reduced to $ΔV/A_5$ thereby to become almost zero (0). Thus, the output bias level of the differential amplifier 1 is coincident with that of the peak detector 2 with high accuracy regardless of ambient temperature and supply voltage, and accordingly the output offset of the circuit for converting unipolar input to bipolar output generated due to ambient temperature and supply voltage does scarcely occur.

Figure 8:
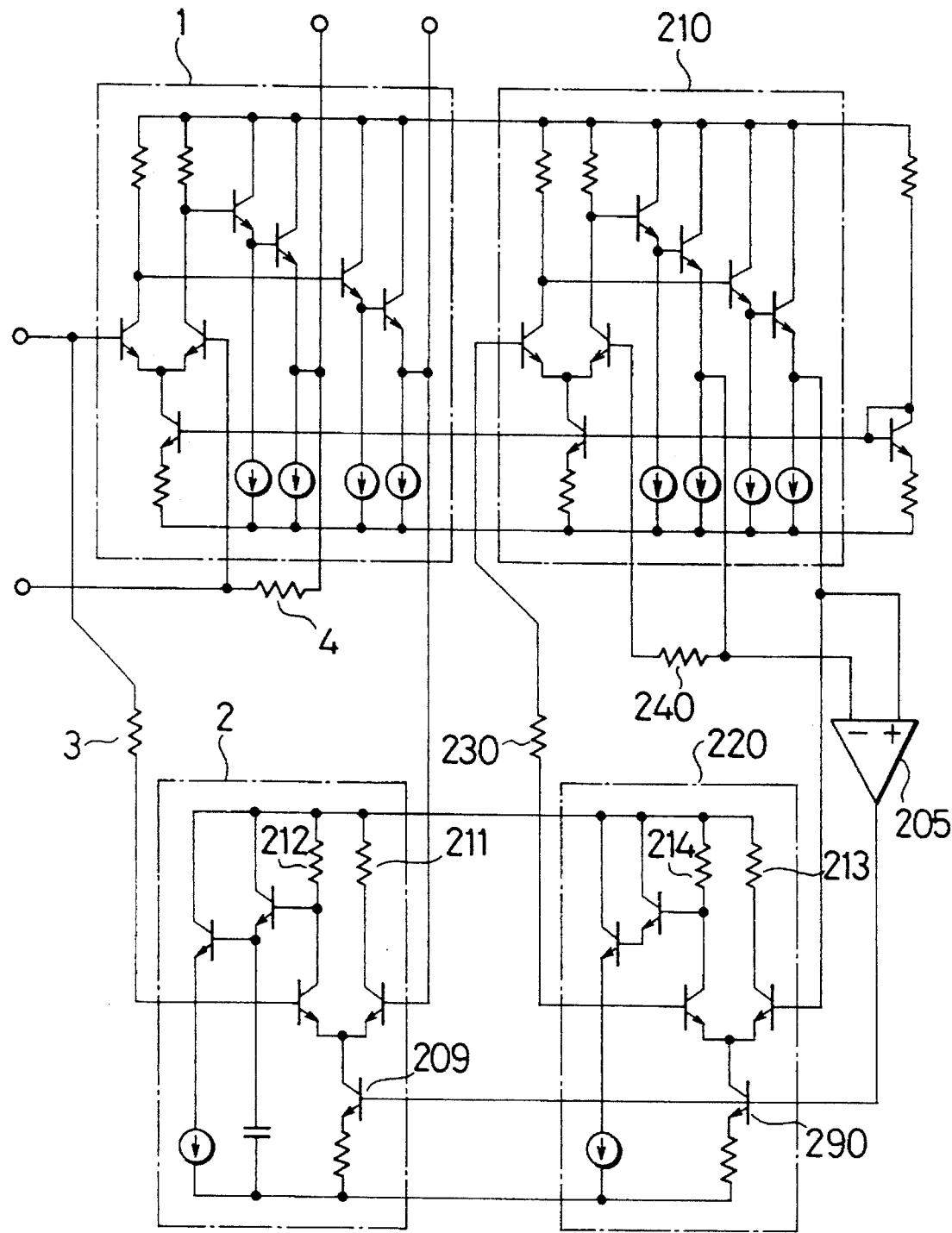
FIG. 8 is a circuit diagram of a fourth embodiment in accordance with the invention.

FIG. 8 is a circuit diagram of a fourth embodiment in accordance with the invention. Similarly to the aforementioned second and third embodiments, a circuit for converting unipolar input to bipolar output illustrated in FIG. 8 has a first differential amplifier 1. The negative output of the differential amplifier 1 is fed back to the positive input thereof through the feedback resistor 4, and the positive output of the differential amplifier 1 is fed back to the negative input thereof through the peak detector 2 and the feedback resistor 3. A dummy differential amplifier 210 has the same structure as the differential amplifier 1. In the dummy differential amplifier 210, the negative output thereof is fed back to the positive input thereof through a dummy feedback resistor 240, and the positive output thereof is fed back to the negative input thereof through a dummy peak detector 220, which has the same structure as the peak detector 2, and the feedback resistor 230. A differential amplifier 205 amplifies a difference voltage between the negative output and the positive output of the dummy circuit for converting unipolar input to bipolar output, and feeds thus amplified difference voltage back to bases of transistors 209 and 290. The transistor 209 comprise current source for driving an amplification stage of the peak detector 2, and the transistor 290 comprise current source for driving an amplification stage of the dummy peak detector 220.

When the output bias voltage of the peak detector 2 is greater than the output bias voltage of the differential amplifier 1 by a voltage ΔV due to variation of temperature and supply voltage thereby to result in that the negative output voltage is higher by a voltage ΔV than the positive output voltage of the circuit for converting unipolar input to bipolar output, the negative output voltage is higher by the common voltage ΔV than the positive output voltage also in the dummy circuit for converting unipolar input to bipolar output. This causes the differential amplifier 205 to produce greater output voltage, and accordingly the base voltages of the transistors 209, 290 go up thereby to increase current flowing in the amplification stages of the peak detector 2 and the dummy peak detector 220. Thus, the voltage drop increases in the collector resistances 211, 212, 214 of the amplification stage and accordingly the output bias voltages of the peak detector 2 and the dummy peak detector 220 decrease. Accordingly, the difference voltage between the dummy peak detector 220 and the dummy differential amplifier 210 is reduced, and accordingly the difference voltage between the negative output and the positive output of the dummy circuit for converting unipolar input to bipolar output becomes almost zero (0). Since the difference voltage between the positive output bias voltage and the negative output bias voltage of the circuit for converting unipolar input to bipolar output is equal to the difference voltage between the positive output voltage and the negative output voltage of the dummy circuit for converting unipolar input to bipolar output, the output offset of the circuit for converting unipolar input to bipolar output does scarcely occur regardless of ambient temperature and supply voltage.

In the above mentioned second, third and fourth embodiments, the output voltage of the differential amplifier 205 is fed back to the bases of the transistors 209, 290 working as a current source for driving the amplification stages of the peak detector 2 and the dummy peak detector 220, however, the output voltage of the differential amplifier 205 may be fed back to other DC operation point adjustment terminal of the peak detector 2 and the dummy peak detector 220.

Furthermore, in the above mentioned second, third and fourth embodiments, though the output bias voltage of the peak detector 2 is subject to the output bias voltage of the differential amplifier 1, the output bias voltage of the differential amplifier 1 may be subject to the output bias voltage of the peak detector 2. Namely, the output voltage of the differential amplifier 205 containing therein a transistor working as a current source for driving the amplification stage of the differential amplifier 1 and the dummy differential amplifier 210 may be fed back to the DC operation point adjustment terminal of the differential amplifier 1 and the dummy differential amplifier 210.

In the fourth embodiment, the output voltage of the differential amplifier 205 may be fed back to an offset adjustment terminal disposed outside a feedback loop constituting a circuit for converting unipolar input to bipolar output.

In the second and third embodiments, though the dummy differential amplifier is connected to the differential amplifier, the dummy differential amplifier may be constructed as another type circuit including voltage division circuit for obtaining an average of the positive output voltage and the negative output voltage.

Figure 9:
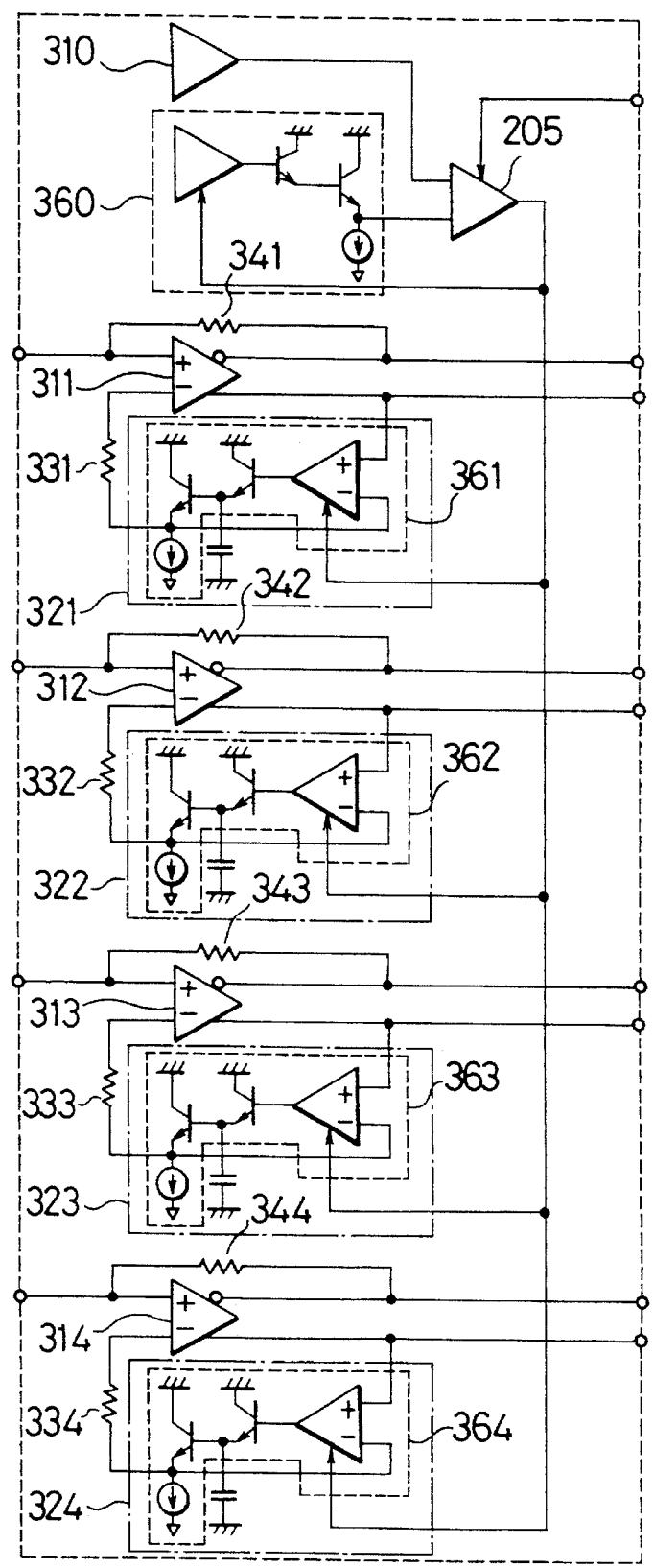
FIG. 9 is a block diagram of a fifth embodiment in accordance with the invention.

FIG. 9 is a block diagram of the fifth embodiment in accordance with the invention, illustrating a structure of a circuit for burst mode type 4 channels preamplifier array IC. The negative outputs of first differential amplifiers 311, 312, 313, 314 associated with each channel are fed back to the positive inputs thereof through feedback resistors 341, 342, 343, 344, and the positive outputs of the first differential amplifier 311, 312, 313, 314 are fed back to the negative inputs thereof through the peak detectors 321, 322, 323, 324 and feedback resistors 331, 332, 333, 334. Thus, the circuit illustrated in FIG. 9 has four circuits for converting unipolar and bipolar codes. The peak detectors 321, 322, 323, 324 comprise voltage follower circuits in which the positive outputs of second differential amplifiers 361, 362, 363, 364 are fed back to the negative inputs thereof. The first and second dummy differential amplifier 210 and 260 generate voltages equal to the output bias voltages of the first and second differential amplifier 311, 312, 313, 314 and 361, 362, 363, 364. The third differential amplifier 205 amplifies the difference voltage between the output voltages of the second dummy differential amplifier 260 and the first dummy differential amplifier 210 and feeds thus amplified difference voltage back to the DC operation point adjustment terminal of the second differential amplifier 361, 362, 363, 364 and the second dummy differential amplifier 260. These all circuits are integrated into one integrated circuit chip.

How this circuit operates when the output bias voltage of the second differential amplifier 206 is greater by a voltage ΔV than the output bias voltage of the differential amplifier 1 is the same as the second embodiment.

In the second to fourth embodiments, a number of circuit elements is increased due to introduction of the dummy circuit and the differential amplifier 205, while a number of circuit elements increases only a little per a channel since the dummy circuit and the differential amplifier 205 have common unipolar and bipolar codes of four channels in this fifth embodiment.

In this fifth embodiment, the array has four channels, however, the array has another number of channels. The fifth embodiment corresponds to an integrated circuit fabricated by integrating by four channels the circuit shown in the second embodiment. It is also possible to integrate by several channels the circuits shown in the third and fourth embodiments.

In this fifth embodiment, although the output voltage of the differential amplifier 205 is fed back to the DC operation point adjustment terminal of the second differential amplifier 361, 362, 363, 364 and the second dummy differential amplifier 260, the output voltage of the differential amplifier 205 may be fed back to the DC operation point adjustment terminal of the first differential amplifier 311, 312, 313, 314 and the first dummy differential amplifier 210.

Figure 10:
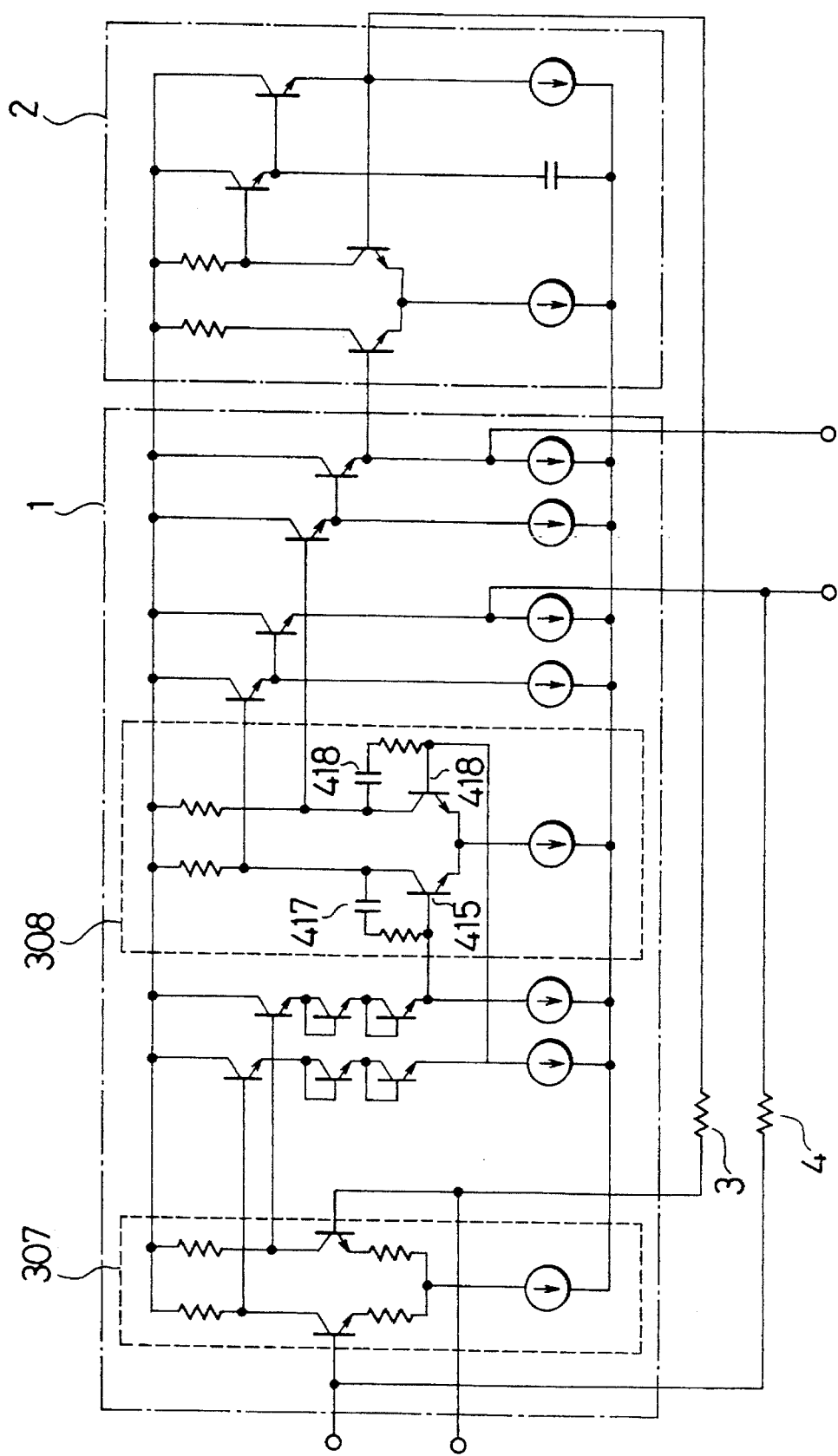
FIG. 10 is a circuit diagram of a sixth embodiment in accordance with the invention.

FIG. 10 is a circuit diagram of a sixth embodiment in accordance with the invention. Similarly to the second to fourth embodiments, the negative output of the differential amplifier 1 is fed back to the positive input thereof through the feedback resistor 4, and the positive output of the differential amplifier 1 is fed back to the negative input thereof through the peak detector 2 and the feedback resistor 3. The differential amplifier 1 comprises an input buffer stage 307, an amplification stage 308 and a level shift circuit. The input buffer stage 307 comprises an emitter-coupled amplification circuit having an emitter degeneration resistor therein, and has sufficiently high input resistance by disposing the emitter degeneration resistor. The amplification stage 308 comprises an emitter-coupled amplification circuit, and has capacitors 417, 418 between bases and collectors of transistors 415, 416 thereby to narrow bandwidth of the transistors 415, 416.

The narrow banding by means of the amplification stage 308 and the reduction of the feedback resistors 3, 4 make it possible that a pole of the lowest frequency among feedback amplifier circuits forming a circuit for converting unipolar input to bipolar output is determined with a cut off frequency of the amplification stage of the differential amplifier, and that a pole of the second lowest frequency is determined with a cut off frequency of an input section of the circuit for converting unipolar input to bipolar output. Accordingly, the phase margin does not decrease if the feedback is increased by reducing the feedback resistor. Since the input buffer stage 307 makes it possible to enhance the input resistance of the differential amplifier 1 and the limit of the bandwidth in the amplification stage 308 makes it possible to reduce the feedback resistors 3, 4, the input resistance of the differential amplifier 1 can be made sufficiently higher than the feedback resistors 3, 4 thereby to enhance the accuracy in converting unipolar and bipolar codes relative to the conventional circuits.

The accuracy in converting unipolar and bipolar codes is dependent on current gain $\beta$ of transistors disposed in the input stage of the differential amplifier 1. In this sixth embodiment, the input resistance is about 50 kilo ohms when the feedback resistor is one kilo ohm and the current gain $\beta$ is 100. Even if the current gain $\beta$ is reduced by half, the input resistance is about 25 kilo ohms and hence is sufficiently higher than the feedback resistor. Thus, the accuracy in converting the unipolar and bipolar codes is little dependent on the current gain $\beta$.

In this sixth embodiment, the emitter-coupled amplification circuit disposing the emitter degeneration resistor therein is used as an input buffer stage, however, other circuits may be used instead such as an emitter follower circuit capable of obtaining high input resistance. The limitation of bandwidth is carried out in the sixth embodiment by disposing a capacitor(s) in an amplification stage between a base(s) and a collector(s) of a transistor(s) constituting an emitter-coupled amplification circuit, but may be carried out in other ways.

As aforementioned, the invention provides a circuit for converting unipolar input to bipolar output for ATC having little dependency of receiving sensitivity on supply voltage and ambient temperature and contributing to fabricating a digital receiver having wide bandwidth and high accuracy and consuming only low power. In addition, the invention can carry out speedy and stable resets without giving limitation to the succession of "L" level in a burst in transmission signals in TDMA system. Thus, the invention provides quite useful circuit for converting unipolar input to bipolar output.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A circuit for converting unipolar input to bipolar output comprising:

a differential amplifier including a first emitter-coupled amplifying circuit and an emitter follower output stage, said emitter follower output stage including two pairs of transistors each pair comprising a first stage transistor and a second stage transistor having a darlington connection with said first stage transistor;

a peak detector including a second emitter-coupled amplifying circuit having an identical DC operation point with said first emitter-coupled amplifying circuit, a current blocking transistor a base of which is connected to the positive output of said second emitter-coupled amplifying circuit and an emitter of which is connected to a hold capacitor for maintaining peak values, and a buffer transistor a base of which is connected to an emitter of said current blocking transistor and an emitter of which is connected to the negative input of said second emitter-coupled amplifying circuit; and first and second feedback resistors;

negative output of said differential amplifier being fed back to a positive input of said differential amplifier through said first feedback resistor, and a positive output of said differential amplifier being fed back to a negative input of said differential amplifier through said peak detector and said second feedback resistor, and a capacitor disposed in parallel between the base and emitter of at least said first stage transistor connected to said first emitter-coupled amplifying circuit among said pair of transistors.

2. A circuit for converting unipolar input to bipolar output comprising:

a differential amplifier including a first emitter-coupled amplifying circuit and an emitter follower output stage, said emitter follower output stage including two pairs of transistors each pair comprising a first stage transistor and a second stage transistor having a darlington connection with said first stage transistor;

a peak detector including a second emitter-coupled amplifying circuit having an identical DC operation point with said first emitter-coupled amplifying circuit, a current blocking transistor a base of which is connected to the positive output of said second emitter-coupled amplifying circuit and an emitter of which is connected to a hold capacitor for maintaining peak values, and a buffer transistor a base of which is connected to an emitter of said current blocking transistor and an emitter of which is connected to the negative input of said second emitter-coupled amplifying circuit;

first and second feedback resistors;

negative output of said differential amplifier being fed back to a positive input of said differential amplifier through said first feedback resistor, and a positive output of said differential amplifier being fed back to a negative input of said differential amplifier through said peak detector and said second feedback resistor;

a capacitor disposed in parallel between the base and emitter of at least said first stage transistor connected to said first emitter-coupled amplifying circuit among said pair of transistors;

a reference voltage producing circuit for producing a reference voltage equivalent to an average of positive output and negative output of said emitter follower output stage of said first stage transistor; and a switching circuit, capable of being externally turned on or off, disposed between an emitter of said current blocking transistor and said reference voltage producing circuit.

3. A circuit for converting unipolar input to bipolar output comprising:

a differential amplifier including a first emitter-coupled amplifying circuit and an emitter follower output stage, said emitter follower output stage including two pairs of transistors each pair comprising a first stage transistor and a second stage transistor having a darlington connection with said first stage transistor;

a peak detector including a second emitter-coupled amplifying circuit having an identical DC operation point with said first emitter-coupled amplifying circuit, a current blocking transistor a base of which is connected to said positive output of said second emitter-coupled amplifying circuit and an emitter of which is connected to a hold capacitor for maintaining peak values, and a buffer transistor a base of which is connected to an emitter of said current blocking transistor and an emitter of which is connected to the negative input of said second emitter-coupled amplifying circuit; and first and second feedback resistors;

negative output of said differential amplifier being fed back to positive input of said differential amplifier through said first feedback resistor, and positive output of said differential amplifier being fed back to negative input of said differential amplifier through said peak detector and said second feedback resistor, a reference voltage producing circuit for producing a reference voltage equivalent to an average of positive output and negative output of said emitter follower output stage of said first stage transistor; and a switching circuit capable of being externally turned on or off, disposed between an emitter of said current blocking transistor and said reference voltage producing circuit.

4. A circuit for converting unipolar input to bipolar output in accordance with claim 3, wherein said reference voltage producing circuit comprises a voltage divider for obtaining an average of the positive output and negative output of said first emitter-coupled amplifying circuit by means of voltage division; a darlington pair including two stages of transistor, a base of a first stage transistor being connected to said voltage divider; and an impedance convertor connected to an emitter output of said first stage transistor of said darlington pair.

5. A circuit for converting unipolar input to bipolar output comprising:

a differential amplifier including a first emitter-coupled amplifying circuit and an emitter follower output stage, said emitter follower output stage including two pairs of transistors each pair comprising a first stage transistor and a second stage transistor having a darlington connection with said first stage transistor;

a peak detector including a second emitter-coupled amplifying circuit having an identical DC operation point with said first emitter-coupled amplifying circuit, a current blocking transistor a base of which is connected to said positive output of said second emitter-coupled amplifying circuit and an emitter of which is connected to a hold capacitor for maintaining peak values, and a buffer transistor a base of which is connected to an emitter of said current blocking transistor and an emitter of which is connected to the negative input of said second emitter-coupled amplifying circuit;

first and second feedback resistors;

negative output of said differential amplifier being fed back to positive input of said differential amplifier through said first feedback resistor, And positive output of said differential amplifier being fed back to a negative input of said differential amplifier through said peak detector and said second feedback resistor;

a reference voltage producing circuit for producing a reference voltage equivalent to an average of a positive output and a negative output of said emitter follower output stage of said first stage transistor;

a switching circuit capable of being externally turned on or off, disposed between an emitter of said current blocking transistor and said reference voltage producing circuit, and said reference voltage producing circuit comprises a voltage divider for obtaining an average of the positive output and negative output of said first emitter-coupled amplifying circuit by means of voltage division; a darlington pair including two stages of transistors, a base of a first stage transistor being connected to said voltage divider; and an impedance convertor connected to an emitter output of said first stage transistor of said darlington pair.

6. A circuit for converting unipolar input to bipolar output comprising:

a first differential amplifier;

first and second feedback resistors;

a peak detector including a second differential amplifier;

negative output of said first differential amplifier being fed back to positive input of said first differential amplifier through said first feedback resistor, and positive output of said first differential amplifier being fed back to negative input of said first differential amplifier through said peak detector and said second feedback resistor, said peak detector comprising a voltage follower circuit in which positive output of said second differential amplifier is fed back to negative input of said second differential amplifier, a first dummy differential amplifier circuit for producing a voltage equal to an output bias level of said first differential amplifier;

a second dummy differential amplifier circuit for producing a voltage equal to an output bias level of said second differential amplifier being in the condition that positive output thereof is not fed back to negative input thereof; and a third differential amplifier for amplifying a difference voltage between said first and second dummy differential amplifier circuits and for feeding said amplified difference voltage back to an input of DC operation point adjustment of one of said first differential amplifier and said first dummy differential amplifier circuit, and said second differential amplifier and said second dummy differential amplifier circuit.

7. A circuit for converting unipolar input to bipolar output in accordance with claim 6, wherein said first and second dummy differential amplifier circuits and a plurality of said circuits for converting unipolar input to bipolar output are integrated into one integrated circuit chip.

8. A circuit for converting unipolar input to bipolar output comprising:

a first differential amplifier;

first and second feedback resistors;

a peak detector;

negative output of said first differential amplifier being fed back to positive input of said first differential amplifier through said first feedback resistor, and positive output of said first differential amplifier being fed back to negative input of said first differential amplifier through said peak detector and said second feedback resistor, a dummy differential amplifier circuit for producing a voltage equal to an output bias level of said first differential amplifier;

a dummy peak detector for producing a voltage equal to an output bias level of said first differential amplifier; and a second differential amplifier included in said peak detector for amplifying a difference voltage between said dummy differential amplifier circuit and said dummy peak detector, and for feeding said amplified difference voltage back to an input of DC operation point adjustment of one of said first differential amplifier and said dummy differential amplifier circuit, and said peak detector and the dummy peak detector.

9. A circuit for converting unipolar input to bipolar output in accordance with claim 8, wherein said dummy differential amplifier circuit, said dummy peak detector and a plurality of said circuit, for converting unipolar input to bipolar output are integrated into one integrated circuit chip.

10. A circuit for converting unipolar input to bipolar output comprising:

a first differential amplifier;

first and second feedback resistors;

a peak detector;

negative output of said first differential amplifier being fed back to positive input of said first differential amplifier through said first feedback resistor, and positive output of said first differential amplifier being fed back to negative input of said first differential amplifier through said peak detector and said second feedback resistor, a dummy circuit for converting unipolar input to bipolar output having the same direct-current characteristics as said circuit for converting unipolar input to bipolar output; and a second differential amplifier included in said peak detector for amplifying a difference voltage between positive and negative outputs of said dummy circuit for converting unipolar input to bipolar output, and for feeding said amplified difference voltage back to an input of offset adjustment of said circuit for converting unipolar input to bipolar output and said dummy circuit for converting unipolar input to bipolar output.

11. A circuit for converting unipolar input to bipolar output in accordance with claim 10, wherein said dummy circuit for converting unipolar input to bipolar output and a plurality of said circuits for converting unipolar input to bipolar output are integrated into one integrated circuit chip.

12. A circuit for converting unipolar input to bipolar output comprising:

a differential amplifier;

first and second feedback resistors; and a peak detector;

negative output of said differential amplifier being fed back to positive input of said differential amplifier through said first feedback resistor, and positive output of said differential amplifier being fed back to negative input of said differential amplifier through said peak detector and said second feedback resistor, said differential amplifier having two or more stages including at least an input buffer stage and an amplification stage.

13. A circuit for converting a unipolar input to a bipolar output in accordance with claim 12 further comprising means for determining a pods of a lowest frequency among feedback and amplifier circuits forming said circuit for converting unipolar input to bipolar output in response to a cut-of frequency of an amplification stage of said differential amplifier.

* * * * *